United States Patent [19]

Stewart

[11] Patent Number: 4,775,250
[45] Date of Patent: Oct. 4, 1988

[54] REPLACEABLE SHIM

[76] Inventor: Matthew M. Stewart, 4839 Wickford Dr., Sylvania, Ohio 43560

[21] Appl. No.: 57,328

[22] Filed: Jun. 4, 1987

[51] Int. Cl.$^4$ .................... F16C 33/00; F16H 35/08; F16B 43/00
[52] U.S. Cl. ...................... 384/626; 74/401; 403/365; 403/409.1; 411/532; 411/536
[58] Field of Search ............. 384/626, 602, 420, 425, 384/427; 74/409, 401, 801; 403/409.1, 365; 411/531–547

[56] References Cited

U.S. PATENT DOCUMENTS

| 885,052 | 4/1908 | Jensen | 411/532 |
|---|---|---|---|
| 1,556,940 | 10/1925 | Leis | 384/250 |
| 1,672,195 | 6/1928 | Berge | 384/420 |
| 1,712,408 | 5/1929 | Strandlund | 411/539 |
| 1,915,640 | 6/1933 | Alsaker | 411/532 |
| 2,261,415 | 11/1941 | Schnell | 411/531 |
| 2,473,307 | 6/1949 | Seipt et al. | 384/626 |
| 2,713,806 | 7/1955 | Dodge | 411/536 |
| 2,980,572 | 4/1961 | Bagdon et al. | 156/288 |
| 3,730,600 | 5/1973 | Degnan | 384/626 |
| 4,222,290 | 9/1980 | Helmer | 74/801 |

Primary Examiner—Stuart S. Levy
Assistant Examiner—Thomas R. Hannon
Attorney, Agent, or Firm—Gifford, Groh, VanOphem, Sheridan, Sprinkle and Dolgorukov

[57] ABSTRACT

A replaceable shim is provided for a planetary gear arrangement of the type having planetary gears each of which is rotatably mounted to a frame by a shaft. The shim includes an elongated flat body having a generally U-shaped recess at one end and which is adapted to be inserted in between the planetary gear and the frame so that the shaft is positioned within the U-shaped recess. The opposite end of the shim is then pivotal to a position in which the opposite end abuts against a portion of the frame thus locking the shaft in the U-shaped recess on the shim body. A bendable locking tab is then bent to a position in which the bending tab abuts against a second surface on the frame and prevents further pivotting of the shim. In doing so, the bending tab locks the shim to the frame with the planetary gear shaft positioned within the shim recess.

5 Claims, 1 Drawing Sheet

REPLACEABLE SHIM

BACKGROUND OF THE INVENTION

I. Field of the Invention

The present invention relates generally to shims and, more particularly, to a replaceable shim for a planetary gear arrangement.

II. Description of the Prior Art

Many automotive transmissions include planetary gear arrangements in which a plurality of planetary gears are each rotatably mounted to a frame by individual shafts. These shafts in turn are fixedly secured to the frame for the planetary gear arrangements. An annular shim is conventionally positioned around the shaft in between each end of the planetary gear arrangement and its frame.

After prolonged use, however, the shims on the planetary gear arrangement become worn and ultimately require replacement. The replacement of these shims, however, has been a difficult and expensive procedure.

More specifically, in order to replace the shims in the planetary gear arrangement, it has been the previous practice to remove the frame together with the planetary gears from the transmission. The shaft is then pressed out of the frame which allows new shims to be inserted in between the ends of the planetary gear and the frame. Thereafter, the shaft is repressed back into place in the frame and the planetary gear arrangement is ultimately reinstalled in the transmission.

Since the above procedure to replace the shims in the planetary gear arrangement not only requires removal of the planetary gear arrangement from the transmission, but also requires specialized and expensive equipment in order to temporarily remove the planetary gears from their frame and thereafter replace the planetary gears in the frame, such an operation has been previously very expensive to perform. In some cases, it is simpler and less expensive to simply replace the entire planetary gear arrangement rather than to repair it even though only a relatively inexpensive shim requires replacement.

SUMMARY OF THE PRESENT INVENTION

The present invention provides a replaceable shim for a planetary gear arrangement which overcomes all the above mentioned disadvantages of the previously known devices.

In brief, the shim of the present invention comprises an elongated and flat body having a generally U-shaped recess formed at one end. The U-shaped recess has a width designed to fit around the shaft in the planetary gear arrangement while the thickness of the body is the same thickness as the desired shim. In order to install the replacement shim of the present invention in the planetary gear arrangement, the shim is positioned in between the planetary gear and the frame so that the shaft for the planetary gear is nested in the U-shaped recess.

The shim is then pivoted in one rotational direction until its opposite end abuts against a first surface on the planetary gear frame which prevents further pivotal movement of the shim in that rotational direction. A bending tab at the opposite end of the shim is then bent to a locking position. In its locking position, the bending tab abuts against a second surface on the planetary gear frame and prevents pivotal movement of the shim in the opposite rotational direction. In this fashion, the bending tab, together with the first surface on the shim locks the bearing shim against rotation with respect to the planetary gear frame and thus locks the shim in position between the end of the planetary gear and the planetary gear frame.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
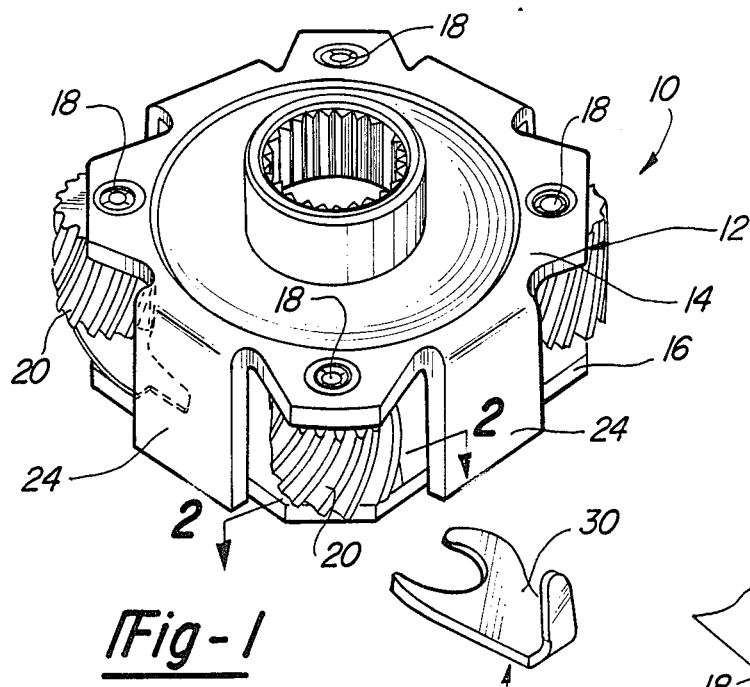
FIG. 1 is a perspective view illustrating a planetary gear arrangement utilizing a preferred embodiment of the shim of the present invention.

With reference first to FIG. 1, a planetary gear arrangement 10 is thereshown having a frame 12 having two plates 14 and 16 which are spaced apart and generally parallel to each other. A plurality of shafts 18 extend between and are secured to the plates 14 and 16 and the shafts 18 are circumferentially spaced from each other around the frame 12.

A planetary gear 20 is rotatably mounted to each shaft 18 so that the planetary gears 20 are sandwiched in between the frame plates 14 and 16. A standard shim (not shown) is conventionally positioned in between each end of each planetary gear 20 and the respective plate 14 or 16.

In order to secure the plates 18 in a spaced apart and parallel relationship, a plurality of cross members 24 extend in between and are fixedly secured to the plates 14 and 16. Preferably, one cross member 24 extends between the plates 14 and 16 between each adjacent pair of planetary gears 20.

After prolonged use, the standard shims become worn and ultimately require replacement. Previously, in order to replace each shim, it has been previously necessary to press the shaft 18 out of the frame 12, replace the standard shim and then repress the shaft 18 back into the frame 12.

Figure 2:
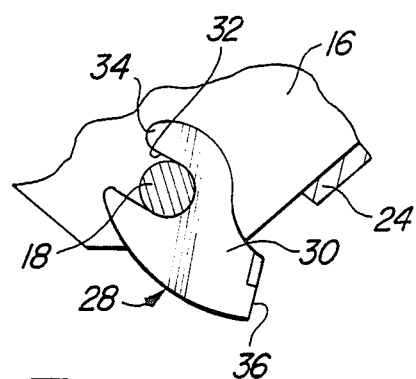
FIG. 2 is a partial sectional view taken substantially along line 2—2 in FIG. 1 and illustrating an initial step in the installation of the preferred embodiment of the present invention.
Figure 3:
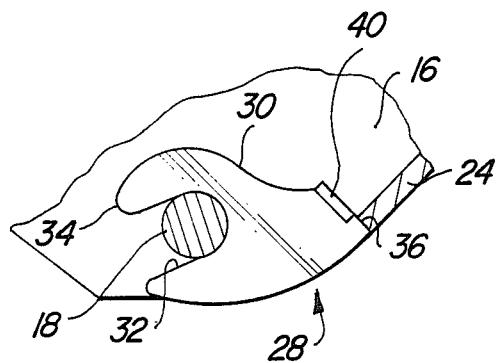
FIG. 3 is a view similar to FIG. 2 but illustrating the preferred embodiment of the present invention rotated to an operable position.

The present invention eliminates the necessity of pressing the shaft 18 out of the frame 12 in order to replace the standard shim. With reference then to FIGS. 1–3, the shim 28 of the present invention comprises an elongated and generally flat body 30 having a generally U-shaped recess 32 at one end 34. This recess 32 has a width substantially the same as the shaft 18 so that the shim 28 can be positioned as shown in FIG. 2 in which the shaft 18 nests at the bottom of the recess 32. Furthermore, as shown in FIG. 2, the shim 28 can be inserted into the planetary gear arrangement 10 so that the recess 32 is positioned around the shaft 18 without the necessity of removing the shaft 18 from the frame 12.

With reference now to FIG. 2, the shim 28 is inserted over the shaft 18 in between the gear 20 and the plate 16 so that the end 36 of the shim 28 opposite from the end 34 of the shim 28 protrudes outwardly from the planetary gear frame 12. The shim 28 is then rotated to the position shown in FIG. 3. In doing so, the end 36 of the shim body 30 abuts against the cross member 24 thus preventing further pivotal movement of the shim 28 in the counterclockwise direction as viewed in FIG. 3. Furthermore, the surface 36 faces away from or in the opposite direction from the recess 32 so that the shim 28 is wedged or constrained in between the shaft 18 and the cross member 24.

Figure 4:
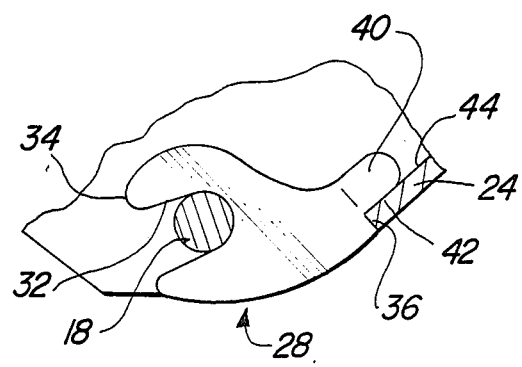
FIG. 4 is a view similar to FIG. 3 but illustrating the preferred embodiment of the present invention locked in place to the planetary gear arrangement.

With reference now to FIGS. 3 and 4, with the shim 28 in the position shown in FIG. 3, a bending tab 40 integrally formed with the shim body 30 is then bent from a position shown in FIG. 3 in which the bending tab 40 extends perpendicularly outwardly from the plane of the shim body 30, and to the position shown in FIG. 4 in which the bending tab 40 is coplanar with the shim body 30. Furthermore, with the bending tab 40 in a position shown in FIG. 4, a surface 42 on the bending tab 40 abuts against an inside surface 44 of the cross member 24 thereby preventing pivotal movement of the shim 28 in a clockwise direction as viewed in FIG. 4.

Consequently, with the bending tab 40 in the unlocked position shown in FIGS. 2 and 3, the shim 28 can be rotated between the positions shown in FIGS. 2 and 3. Conversely, with the bending tab 40 in the locked position shown in FIG. 4, the bending tab 40 together with the end 36 of the shim body 30 locks the shim 28 in place to the planetary gear frame 12. This also simultaneously maintains the shaft 18 in the recess 32 so that the portion of the shim body 30 immediately adjacent the recess 32 forms a shim which replaces the original shim.

From the foregoing, it can be seen that the present invention provides a simple, inexpensive and yet totally effective method for replacing the shim in a planetary gear arrangement. A primary advantage of the shim of the present invention is that it can replace the original shim without the necessity of removing either the planetary gears or their shafts from the planetary gear frame.

Having described my invention, however, many modifications thereto will become apparent to those skilled in the art to which it pertains without deviation from the spirit of the invention as defined by the scope of the appended claims.

I claim:

1. For use in conjunction with a member rotatably mounted to a shaft, said shaft being secured to a frame, a shim comprising:

a flat body having a recess, said body being insertable between said frame and said member so that said shaft is positioned within said recess, means for locking said body to said frame so that said shaft remains in said recess comprising a surface on said body adapted to abut against a surface on said frame, said body surface being spaced from and facing substantially away from said recess, a tab on said body, said tab being bendable between an unlocked position and a locked position, wherein in said unlocked position said body is pivotal about said recess to a position in which said body surface abuts against said frame surface, and wherein in said locked position, said tab abuts against a second surface on said frame and prevents further pivotting of said body about said recess.

2. The invention as defined in claim 1 wherein said body and said tab are of a one-piece construction.

3. The invention as defined in claim 1 wherein said first and second frame surfaces are substantially perpendicular to each other.

4. The invention as defined in claim 1 wherein said first and second frame surfaces meet at a corner.

5. The invention as defined in claim 1 wherein said recess is U-shaped

* * * * *